United States Patent
Galloway et al.

(10) Patent No.: US 7,080,142 B2
(45) Date of Patent: Jul. 18, 2006

(54) EXTENSIBLE COMPUTER MANAGEMENT RULE ENGINE

(75) Inventors: Jeffery L. Galloway, The Woodlands, TX (US); Curtis R. Jones, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 712 days.

(21) Appl. No.: 10/251,089

(22) Filed: Sep. 20, 2002

(65) Prior Publication Data

US 2004/0059808 A1 Mar. 25, 2004

(51) Int. Cl.
*G06F 15/173* (2006.01)
*G06F 3/00* (2006.01)

(52) U.S. Cl. .................. 709/224; 709/226; 719/318

(58) Field of Classification Search ............... 709/224, 709/226, 220, 221, 222; 715/738, 736; 717/172, 717/177, 178; 719/318
See application file for complete search history.

(56) References Cited

U.S. PATENT DOCUMENTS

| | | | |
|---|---|---|---|
| 6,108,700 A | * | 8/2000 | Maccabee et al. .......... 709/224 |
| 6,219,708 B1 | * | 4/2001 | Martenson .................. 709/226 |
| 6,418,469 B1 | * | 7/2002 | Justice et al. ................ 709/224 |
| 6,470,384 B1 | * | 10/2002 | O'Brien et al. ............. 709/223 |
| 6,732,181 B1 | * | 5/2004 | Lim et al. ................... 709/229 |
| 6,769,022 B1 | * | 7/2004 | DeKoning et al. .......... 709/223 |
| 6,889,231 B1 | * | 5/2005 | Souder et al. ........... 707/104.1 |
| 6,941,339 B1 | * | 9/2005 | McMichael ................. 709/203 |

* cited by examiner

*Primary Examiner*—Ario Etienne
*Assistant Examiner*—El Hadji M. Sall

(57) ABSTRACT

A system and method for controlling computer resources on an interconnected system via an extensible and dynamic rule set. The extensible and dynamic rule set is capable of both monitoring and modifying the condition and operation of the interconnected system. An editor provides the ability to create, delete or modify the individual rules within the extensible and dynamic rules set. An engine is used to trigger individual rules. A rule may be created, deleted, modified or compiled without the recompilation of the engine. Such rules are triggered when conditions specified in the rule are found to exist on the interconnected system. When such conditions exist, the rule is triggered and the operation of the interconnected system is modified as specified in the rule.

27 Claims, 3 Drawing Sheets

Event Provider Table

| | |
|---|---|
| Event Data Type: | time/date |
| User Label: | Time to Backup Alpha |
| Units: | HH:MM |
| Help: | This Event is to backup Alpha server at event time |
| Polled: | Yes |
| Event Driven: | No |
| Get Current Value: | System Clock |
| Invocation: | N/A |

Action Provider Table

| | |
|---|---|
| Verb Name: | Backup System X |
| Perform Action: | Perform Backup: < system identifier>; *Psudo code to perform backup* |
| Failure Code to Text: | 1: success; 0: failure |
| Number of Objects: | 1 |
| Name of Objects: | System Identifier; |
| Get Object List: | N/A |
| Action Help: | This Action is to backup _____ server at event time |
| Object Help: | Name of system to back up; |
| Special Event: | N/A |
| Special Event Inter. | N/A |

Figure 2

Rule format:

*When* [event] *then* (action)

Event format:

{expression template} {expression template}...{expression template}

Expression template format:

{<operand1> <operator> <operand2>}
(*i.e., current time = 11:00 pm, system utilization > 80%*)

Operand format:

The objects that are manipulated by the operators.
(*i.e., current time, power usage, ambient power, active processor count*)

Operator format:

The symbols that denote or perform logical and/or mathematical operations.
(*i.e., =, <, >, <=, >=, <>, +, -, *, / and mod*)

Also, compound operators can also be used.
(*i.e., AND, OR, AND NOT, Recurrence, and FOR*)

Action format:

{action verb}, or {action verb <list of objects>}.
(*i.e. Shutdown Computer 7, Start process group 1 on Computer 42, throttle processors*)

Rule Examples:

when [A = B] then (Z)
when [current time = 11pm] then (turn off server 'Imaccounting01')
when [A – B > C] then (Y)
when [power usage – ambient power > 100 watts] then (throttle processors)
when [processor utilization > 80 AND active processors < 3] then (add a processor)
when [current time = 3am, Recurrence] then (back up server 1)
when [processor utilization > 80%, FOR 30 seconds] then (add a processor)

Figure 3

EXTENSIBLE COMPUTER MANAGEMENT RULE ENGINE

BACKGROUND OF THE INVENTION

1. Field of the Invention

The invention relates to automatically monitoring, analyzing and modifying the operation, configuration, task assignment, deployment, settings or any aspect of a computing device or resource based on a set of editable and extensible rules.

2. Description of the Related Art

Typically, for computer systems to perform at optimal levels and to generally provide their users with the level of functionality desired, such computer systems need to be monitored, analyzed, reconfigured, have tasks assigned, have systems, components and the like deployed or removed, have settings modified, and be otherwise managed by a computer operator or technician. This computer system management begins at the design stage and continues throughout the operating life of the system. At the design stage such computer personnel attempt to predict the optimal computer device component requirements, configuration, task assignments and other particular settings based on knowledge and predictions of the expected usage and of the system. However, often such initial system configurations and settings are less than optimal due to a variety of reasons including, but not limited to, erroneous information, the lack of information, as well as unexpected system operation based on the complex interactions inherent in complicated multiple component/multiple setting systems.

However, even where the initial system configurations are satisfactory, this acceptable level of configuration may be subsequently upset and operating efficiencies may be lost as components are added, system demand levels change, resource activity shifts, software or hardware failures occur, or other system variables change over time. Such changes can be incremental, cyclical or random, and can be generally easy to predict, or can be all but unexpected. The causes of system inefficiencies may occur alone or in combination, and where they occur in combination, the complexities of analyzing and responding to such causes may push the limits of the ability of the computer technicians to adequately and timely respond.

Typically, the managing and controlling of the operation, configuration, task assignment, deployment, settings and other operational aspects of computing resources have been performed manually. As such, an operator or technician has been required to be present and to be continually actively monitoring all symptomatic indicators of such systems. Such computer personnel need to manually identify, diagnose and remedy problems that arise during their watch. Such manual activity, like manual activity generally, is subject to the limitations and fallibility of the individual performing the activity. Here, the nature of the computing resources, including their complexity, speed and interactivity, add to the complexity of manually monitoring and managing their operation. Further, although such manual methods have allowed for the real time monitoring and modification of particular aspects of the operation of a computing device, and even in those systems that have been partially automated, the ability to monitor and make changes have been generally based around a set of fixed actions or otherwise have provided limited options. For example, operators being notified on detection of a hardware failure and they must dispatch repair personnel, or parameters indicating excessive system demand or poor performance because of demand inform an administrator that new computing resources should be deployed by either bringing additional systems online or adding new hardware to existing systems.

Eventually, and as mentioned above, what were originally strictly manual computer device management tools were enhanced to include newer management tools which included automated techniques to better assist them in managing the operation, configuration, settings, and the like, of computing resources. Such systems include things like deleting temporary directories when disk space becomes critically low or switching to standby hardware when a failure is detected in the primary hardware. Although such systems provided automated reactions to particular symptomatic identifiers, the actions and options were typically fixed or limited. Being so limited, these computer management systems could only comprehend a certain fixed set of rules as determined by a predefined rule flow or predefined flowchart. A limitation of these systems has been that their operation has not been easily editable or easily extensible, and as such, have been difficult to both modify and/or expand their capabilities once installed. Such systems have provided computer personnel with a limited variety of both symptomatic identifiers that trigger solutions, and diagnoses that remedy the identified inefficiencies. Specifically, such systems have typically not allowed the technicians to add to automated responses, any previously undefined monitoring or actions, when such a need was identified after deployment of management software systems. As such, although such systems have allowed technicians and operators to modify some set of predefined monitors and actions they still require them to perform some additional manual operations or re-deploy management software with the added management options if new conditions or needs arise. Thus, the current systems provide limited functionality and as such have do not provide computer personnel with the tools necessary for them to optimally manage and flexibly modify the management of today's computer resources or the computer resources of tomorrow.

The every day problems experienced by computer personnel in identifying, diagnosing and analyzing inefficiencies that arise during the operation of computer devices, as well as the problems they experience in implementing appropriate and timely solutions in response to such inefficiencies, continue to be exacerbated by the ever increasing complexity of today's computer environments. Specifically, computer environments continue to increase in complexity with the systematic introduction of more powerful servers, the continued exploding demand in storage needs, the continued increase in the need to handle transactions and the general interactivity from multiple requestors from multiple locations and platforms, as well as other like system changes that impact the complexity of such computer environments. This increase in complexity has been accompanied by an increase in the diagnostic indicators to monitor, the types of diagnoses to consider, and the potential solutions to implement. This increase in computer environment complexity together with the limited level of computer resource management tool functionality available have placed heavy burdens on those who manage and control computer system resources to a point where doubt has been raised as to whether such computer personnel can keep up.

The difficulties inherent in the ever increasing complexity of today's computer environments, and the ever increasing inability of operators and technicians to optimally, both in time and in quality, and even with the aid of computer resource management tools, identify, diagnose and remedy the inefficiencies that arise in computing device systems, along with the inability of present systems to allow for effective and easy expansion of current detection, diagnosis and remedies, to include those that are newer and more effective, considered together or alone, leave the state of computer resource control and management at a level that is less than desirable, and at a level that will grow to be even less desirable as the level of computer environment complexity continues to increase.

SUMMARY OF THE INVENTION

A system and method for controlling computer resources on an interconnected system via an extensible and dynamic rule set. The extensible and dynamic rule set is capable of both monitoring and modifying the condition and operation of the interconnected system. An editor provides the ability to create, delete or modify the individual rules within the extensible and dynamic rules set. An engine is used to trigger individual rules. A rule may be created, deleted, modified or compiled without the recompilation of the engine. Such rules are triggered when conditions specified in the rule are found to exist on the interconnected system. When such conditions exist, the rule is triggered and the operation of the interconnected system is modified as specified in the rule.

BRIEF DESCRIPTION OF THE DRAWINGS

A better understanding of the present invention can be obtained when the following detailed description of the disclosed embodiment is considered in conjunction with the following drawing, in which:

FIG. 2 contains examples of the type of registration information that may be stored in an event provider table and in an action provider table; and FIG. 3 contains a rule format example, including event and action formats, and an exemplary rule set.

DETAILED DESCRIPTION OF PREFERRED EMBODIMENT

Generally

Figure 1:
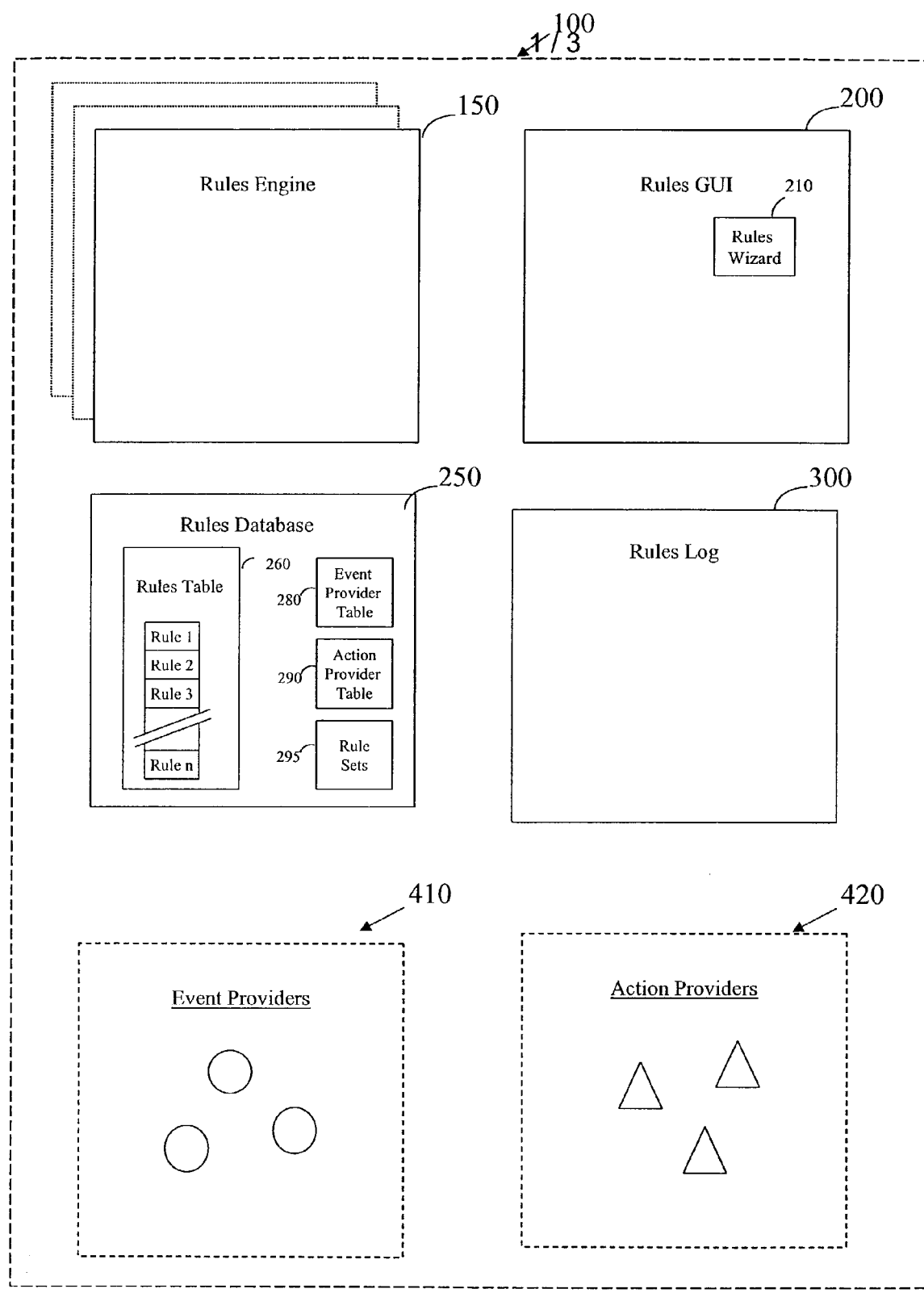
FIG. 1 is a block diagram showing the four major modules and the two provider sets.

FIG. 1 illustrates an example of a computer resource management system 100 implemented according to the disclosed techniques. The term "computer resource" generally refers to a computing device with a subset or superset of typical computing functions of a personal computer. For purposes of explanation, specific embodiments are set forth to provide a thorough understanding of the present invention. However, it will be understood by one skilled in the art, from reading the disclosure, that the invention may be practiced without these details. Moreover, well-known elements, data structures, data handling, intra and inter computer resource communication, process steps, and the like, and including, but not limited to, electronic circuitry components and connections, are not set forth in detail in order to avoid obscuring the disclosed system.

As shown in FIG. 1, computer resource management system 100 contains four main modules: rules engine 150, rules graphic user interface (GUI) 200, rules database 250, and rules log 300. Through these modules users are able to control computer resources by easily editing (i.e., creating, deleting and modifying) rules in a format that is flexible enough to provide users with the ability to enter rules in the future that will control computer resources associated with presently unknown future software and hardware environments. Rules are separated into executable events and actions. Events are monitored for their occurrence, and actions are performed in response to the detection of the corresponding event. In the current embodiment the event providers 410 and action providers 420, both executable, are used to assist the rules engine 150, also executable, in detecting the occurrence of such events and the subsequent execution of the corresponding actions. A user creates and modifies rules through rules GUI 200. The rules GUI 200 reads and writes rules information from and to the rules database 250. The rules engine 150 reads such rules information from rules database 250 so that it may monitor and execute the current set of active rules. The rules log 300 records information relating to actions as the actions are triggered in response to an event occurrence and are subsequently viewable via rules GUI 200.

Rules Database

As shown in FIG. 1, rules database 250 includes a rules table 260, an event provider table 280, an action provider table 290 and a rule sets table 295. Here, the term 'table' is used to indicate a data relationship, i.e., the data relationships found in column-row type structures, and is not intended to indicate any particular data structure or structures for maintaining such relationships. Rules table 260 is the depository for all of the rules information. In addition, rules table 260, is created and maintained via rules GUI 200. In addition, rules engine 150 also stores event and action provider registration information in the event provider table 280 and the action provider table 290, respectively. This registration information is the dynamic registration information that allows executable rules to be added after the rules engine 150 has been compiled. Since the rules database 250 holds such dynamic and extensible event and action provider information allowing executable events and executable actions to be added without consideration of when the rules engine is complied, it is also referred to as the dynamic rules database 250. Further, rule sets table 295 stores rule sets along with an indicator as to whether they are enabled or disabled. The information in the rules database 250 is used by the rules engine 150 to retrieve the current active rules and all the related information. The implementation of the tables 260, 280, 290 and 295 in the rules database does not require that all the data be maintained in just one physical database file, but rather it may be maintained in multiple databases, and may be located in multiple locations. As such, one or more tables, 260, 280, 290 and 295 may only be a collection point or interface for accessing rules information spread across the entire interconnected computer system or network of computer systems. As such, it is contemplated that portions of the registration and rule information maybe contained in the system registry if such an arrangement proves advantageous.

Rules

Rules table 260, as shown in FIG. 1, contains information regarding the rules available to rules engine 150. In the current embodiment rules are referred to through their unique ID number. It is contemplated that other embodiments may use other identification means such as alphabetical labels, zero-based addressing or actual address location, or the like. Rules, as shown in FIG. 3, are composed of an event and an associated action. Events are what are monitored to determine if its associated action should be performed. Actions are the things that can be done when an event occurs. The standard format of any rule is "When [event] then (action)," where [event] can be further defined as "[{expression template}{expression template} . . . {expression template}]," where {expression template} is further defined as "{<operand1> <operator> <operand2>}," and where an event may contain one or more expression templates. Operands are the objects (event and data sources) that are manipulated by the operators. Further, operators have data-types (event data types), i.e., boolean, string, integer, floating point, time/date, arithmetic, and the like. Operators are symbols that denote or perform logical and/or mathematical operations. Logical operators include, for example, = (equal), < (less than), > (greater than), <= (less than or equal to), >= (greater than or equal to), and < >(not equal). A general example of the use of a logical operator is "when [{A=B} then (Z)," and more specifically "when [{current time=11 pm} then (turn off server 'lmaccounting01')." It is also contemplated that an expression can simply contain a single operand and a single operator such as "NOT A." Arithmetic operators include, for example, + (addition), − (subtraction), * (multiplication), / (division), mod (modulo), and the like. A general example of an arithmetic operators is "when [{<operand1> <arithmeticop> <operand2> <operator> <operrand3>}] then (action)," or more specifically "when [{A−B>C}] then (Y)," or even more specifically, "when [{power usage−ambient power>100 watts}] then (throttle processors)."

Compound operators can also be used and include AND, OR, NOT, Recurrence, and FOR, and the like. When compound operators AND, OR, or NOT are used the selection expands to create another rule expression template. A simple example of a rule using compound operators is "when [{processor utilization>80°/} AND {active processors<3}] then (add a processor)." Compound operator "Recurrence" is a date/time based pop-up for recurring events, i.e., see Microsoft's Outlook Calendar Appointment Recurrence operation, or Compaq's Computer Insight Manager 7's use of recurring appointment notification. Further, an example of a time based rule using recurrence is "when [{current time=3 am, Recurrence}] then (back up server 1)." A duration example is "when [{processor utilization>80%, FOR 30 seconds} then (add a processor)." In addition, the use of compound operator "FOR" expands to add a time-based duration operator that allows for counter-based events of a fixed time. Also, arithmetic compound operators expand event statements to create a math equation using one new arithmetic operator and one new arithmetic operand.

Events

Again, events, as shown in FIG. 3, are executables that are monitored to determine if they have occurred, i.e., if they have become true. Events represent real events, time or data that occur, or that are collected, within the interconnected systems. Time becomes an event by establishing an alarm time that either occurs once or repeats multiple times. A data source becomes an event by a mathematical expression that results in a true Boolean assertion. The following represent examples of events: "current time=<some time-value>;" "free disk goes below <some level>;" "load on a server exceeds <a certain level>;" "detection of a hot-plug of a new CPU/Memory module." An event can be a compound statement representing multiple sub-events where such sub-events are, in themselves, events. For example, although the compound statement "(A AND B) OR C" is made up of two such events "A AND B" and "OR C," the two statements represent a single true or false result based on the entire Boolean type expression. As discussed above, both an event and data source has an event data type associated with it as well as operators that can be used on them. It is contemplated that the minimum data types may include: Boolean; integer; string; time/data and floating point. As discussed above, Boolean type expressions are just events, and either have a true or false result. Boolean event data types may minimally include the operators: AND, OR and NOT. Integer event data types may minimally allow typical integer operators like those arithmetic operators discussed above. String event data types may minimally allow for comparisons for equality. Time event data types should minimally allow for > (greater-than), = (equal-to) and < (less-than comparisons). Floating point event data types may minimally for + (addition), − (subtraction), * (multiplication) and /(division).

Actions

Again, actions, as shown in FIG. 3, are executables that can be done when an event occurs. Actions are routines that are executed by the rules engine 150 in response to the detection of an event occurrence. The scope of an action is not limited, and as such, can encompass anything that could otherwise be programmed to be performed on the interconnected system. The interconnected system including any local or remotely connected network system or any system capable of flexible communications. More specifically, actions are composed of an action verb alone, or an action verb along with a list of one or more objects. Actions composed of a verb alone represent a verb that is, on its own, an entire action. Actions having both a verb and a list of objects represent a verb that performs its action on or with the list of objects. Some examples of actions include "Shutdown Computer 7," "Start process group 1 on Computer 42," "Deploy Barnes&Noble Web service on NewServer11," "Delete contents of \temp directory," "Enable rule set NightTime" and "Sound alarm." The "Sound alarm" example represents a verb alone action with an implied object where the implied object is "this machine."

Rule Sets

Rules can be grouped into named rules sets 295. The rules sets 295 can also have a state of enabled or disabled. Although it is contemplated that the rules themselves could have an enabled and disabled state, in the present embodiment only sets maintain this functionality. As such, in the present embodiment, the rules have no state and if they are not contained in a set they are global and are always enabled. In the present embodiment, if a user wishes to retain a rule but disable it they can achieve this by putting the rule into a disabled rule set 295. The present embodiment also allows rules sets 295 to have no members. Such rules sets 295 can be activated by a rule which has as its action to enable or disable the particular rules set 295.

Rule Templates

Although other embodiments are contemplated in which rules database 250 is initially empty, and yet even other embodiments which provide rules suggestions based upon information located other than in rules database 250, the present embodiment has rules database 250 initially populated with one or more rules, or rule templates, meant to operate as examples, and to provide typical rules that a user may want to use or modify. Ideally, there should be enough such templates or rules examples to give the user a wide set of choices to begin with. Such templates should only contain the event and action providers, 410 and 420, that are initially installed on the rules engine 150.

Rules Engine

Rules engine 150, shown in FIG. 1, is an executable or service that runs on the system that implements flexible rules which manage computer resources. The rules engine 150, once loaded on a system, can monitor any number of other systems on a network for which it has control. As such, although the rules engine 150 may run on one particular machine, it is capable of monitoring and controlling any number of interconnected networked systems. Interconnected systems are those systems for which the rules engine has control. Flexible communication allows the rules engine 150 to operate on all interconnected systems, i.e., local or remote systems, across operating systems, and also to plug into a standalone application or a browser. These features allow a user to create rules to support today's hardware and software environments and extend them for future unknown hardware and software environments. The ability to extend the rules set, i.e., the system's extensibility, allows future events and actions to be added without modifying the release of the rules engine 150, or recompiling the rules engine 150. This ability to use the same rules engine 150 over time, and as new hardware and software environments emerge, is made possible by defining everything that is needed to be known about displaying and editing rules as well as how to communicate data and commands to implement the rules. In the current embodiment this extensibility is achieved by limiting the checking of the validity of a rule, i.e., its event and action, solely to the time of execution. Thus, the validity of an event is determined solely at the time the event is executed and the validity of an action is determined solely at its time of execution. As such, the rules GUI 200 does not perform a validity check on a rule as it is entered. Nor, in the current embodiment, are the rules as stored in the rules database 250 periodically examined to determine their continued validity. In fact, a rule with a currently valid event that is matched with a currently invalid action, may run undetected until the actual event is detected causing, for the first time, the defective action to attempt to execute and fail. However, it is contemplated that a significant level of extensibility can be maintained by other embodiments which perform some type of validity checking before execution of a rule. Such contemplated systems may perform syntax analysis of such rules from an ever-changing rules syntax module, or other like means capable of validating rules and being updated over time.

Specifically, and as shown in FIG. 1, rules engine 150 has access to rules database 250, event provider 410 and action providers 420. The rules engine 150 collects data and monitors events as specified in the rules database 250 and issues actions when the enabled events occur. In addition, when an event occurs, the rules engine 250 writes related information to the rules log 300 to record each rule that is triggered. In operation, the rules engine 150 begins execution when the system that it is installed on boots. On initialization, and in the current embodiment, the rules engine 150 reads the rules database 250 to determine which rules exist and which are enabled. It is contemplated that other embodiments may not perform such a function on initialization, or that rules engine 150 may receive information regarding which rules exist by a means other than reading rules database 250, such as being notified of the current rules by a second process. However, in the current embodiment the rules engine 150 loops through the two provider tables, 280 and 290, contained on the rules database 250 and connects to all of the enabled-rule event providers 410 and all of the action providers 420. If it is determined that a provider is not available, i.e., the attempt to connect fails, the rules engine generates an event to itself to handle this unavailability status. It is contemplated that multiple rules engines 150 can operate in a given environment, each with their own rules database.

The extensibility aspect of the current system is achieved, in part, due to the nature of the system's registration functionality. As discussed below, the executable event and action providers 410 and 420 are dynamically registered with the system, rather than being hard coded, and can essentially run independently of the rules engine 150, but are designed to run in conjunction with rules engine 150, and as such may be added or removed to the system without requiring any modifications to the overall system. As such, this dynamic registration of providers 410 and 420, means that no recompiling of the rules engine 150 is needed as additional rules are implemented. This ability to add events and actions, i.e., rules, at a later time gives the system the ultimate flexibility for the later addition of future features. Specifically, during registration a component object model (COM) interface is provided and which is considered an object self-describing type of interface.

The rules engine 150 itself registers as both an event and action provider. In the current embodiment the rules engine 150 registers as an event provider for the following events: (1) "provider not available," sent at start up or when a set of rules is enabled and either event or action providers are not available—it identifies registration information about the provider; (2) "rule failure event," indicates a particular rule failed; (3) "time event," one time or repetitive events. Also in the current embodiment, the engine 150 registers as an action provider for the following actions: (1) "enable a rule set;" (2) "disable a rule set;" and (3) "move a rule ID to a named rule set."

Event Providers

Event providers 410, as shown in FIG. 1, collect and deliver data or event information to the rules engine 150. In the current embodiment there is one event provider 410 for each event or compound event. However, it is contemplated that other embodiments may include multiple events within any one event provider 410. An event provider 410 executes its event and reports its results to rules engine 150. Initially, event providers 410 register to add themselves to the rules database 250, rules engine 150 and rules GUI 200. The registration includes exchanging information regarding the events or data such that this information can be edited and used in triggering a rule. In the present embodiment it is contemplated that the registration of event providers 410 includes the storing of the event provider related information into an event provider table 280 stored in rules database 250. However, other embodiments may store such information elsewhere, or spread over many locations, and may also be stored in any variety of known data structures. Further, in the current embodiment, the event providers 410 are dynamically registered in the rules database 250 (dynamic rules database) such that they are independently executable and compilable in relation to rules engine 150. It is contemplated that event providers 410 could be implemented using separate executables that are accessed by remote procedure calls to another local or remote process. It is also contemplated that event providers 410 could be implemented using dynamic link libraries (DLLs).

In the current embodiment it is contemplated that the basic information that will be exchanged at registration, and stored in the event provider table is (1) "event data type," describing the type of data provided by the event; (2) "user label," the label used by the GUI for this data; (3) "units," for numeric types and is a units string to display; (4) "help," to give the user information about this event or data; (5) "polled," whether the rules engine 150 actively polls for the data, and if so, a suggested poll rate, (6) "called," whether the rules engine 150 is passively called, and if so, upon calling the rules engine 150, or an agent thereof, will be called to signal the event or provide the data; (7) "get current value," used by the rules engine 150 for polling the current value of the event or data; (8) "invocation," a means of starting the service that provides the events or data. It is contemplated that other embodiments may exchange more or less information than that described immediately above. FIG. 2 shows an example of the type of registration information that is contemplated as being stored in the event provider table for the current embodiment.

Resource Partition Manager (RPM)(a current Compaq software product which is used to monitor and control certain system resources) is an example of an event provider. It is expected that common event providers will include interconnected system information like performance counters, free disk space and capacity. In addition, it is contemplated that the rules engine 250 will itself be an event provider 410 for time events. As an event provider 410, the rules engine 250 can set an alarm at a certain time or for a repeated time. For repetitive time events it is contemplated that repetitions similar to the following may be used: "Hourly at :30," "Daily at 5:00 PM," "Weekly on Saturday at 12:30 AM," "Monthly on first Sunday at 1:00 PM," "Or on last or nth day of the month," "Annually on March 5 at 8:00 AM," "Arbitrary interval between events to minute granularity," and "Must define start time of repetition." The rules engine 250 as an event provider 410 may also supply the current time. Further, like rule sets 295, it is contemplated that event providers, whether in sets of event providers or in individual event providers, can be enabled or disabled.

Action Providers

As shown in FIG. 1, action providers 420 register with rules database 250, rules engine 150 and rules GUI 200, to provide actions and objects to act on. The registration includes the exchange of information regarding actions such that this information can be edited (i.e., create, delete and modify) and be performed when it is triggered in a rule. The information provides the interface and data needed to edit and perform the actions. In the present embodiment it is contemplated that the registration of action providers 420 includes the storing of the action provider related information into an action provider table 290 stored in rules database 250. However, other embodiments may store such information elsewhere, or spread over many locations, and may also be stored in any variety of known data structures. Further, in the current embodiment, the action providers 420 are dynamically registered in the rules database 250 (dynamics rules database) such that they are independently executable and compilable in relation to rules engine 150. Like event providers 410, it is contemplated that action providers 420 could be implemented using separate executables that are accessed by remote procedure calls to another local or remote process. Also like, event providers 410, it is also contemplated that action providers 420 could be implemented using dynamic link libraries (DLLs).

In the current embodiment it is contemplated that the basic information that will be exchanged at registration and stored in the action provider table is (1) "verb name," which describes the action in a string for display to the user; (2) "perform action," the interface that executes the action—if object to act on are required, they are passed in this interface—success or failure of the action is returned with a failure code in the former; (3) "failure code to text"—translates the failure code to text; (4) "number of objects," a number of objects that must be supplied when the action is performed—each object in the action may be a different sort of object and the positional order of an object defines the type; (5) "name of objects," the name of each of the objects to be displayed to the user; (6) "get object list," given the position of the object in the perform action interface this interface provides the choices of objects to display to the user, that he can pick from—this is always a list of strings and the string selected is returned when performing the action, to identify the object—as implied, the objects in the list are unique; (7) "action help," describes the action to the user; (8) "object help," describes each object type in the required objects; (9) "special event," this is true if the event requires a special interface to display or choose it; and (10) "special event interface," provides the actual control code interface (as is done with the programming interface active-x) that is used to display and select values for this object. FIG. 2 shows an example of the type of registration information that is contemplated as being stored in the action provider table for the current embodiment.

RPM is also an example of an action provider. It is contemplated that common action providers may include command line or shell type actions as well as commands like shutdown or restart. Further, like rule sets 295, and more precisely like event providers 410, it is contemplated that action providers 420, whether in sets of action providers or in individual action providers, can be enabled or disabled.

Rules GUI

The rules GUI 200, as shown in FIG. 1, is the user interface for interacting with the disclosed system. Specifically, rules GUI 200 is used to edit (i.e., create, delete and modify) rules information for inclusion in the rules database 250. The rules GUI 200 is used to view registered event providers 410 and action providers 420, as stored in the rules database 250 in the present embodiment, as well as their current status and to register new event and action providers. Rules GUI 200, in the current embodiment, is also used to view the rules log 300 and also contains a rules wizard 210 to aid in the creation of rules for the first time user. The rules wizard 210 leads the user through the creation of a rule. It leads the user, step-by-step through the instructions as to how to create a rule. In addition, the rules GUI 200 supports the use of rule templates that are typical rules that a user may wish to use. The rule templates support default rules. In the current embodiment, these templates are simply pre-loaded rules in rules database 250 that will appear as default rules. Such rules can be initially grouped into a rules set and be disabled if preferable. Other embodiments may provide such templates in a manner other than that described above, i.e., a separate database stored in the rules GUI 200 for example. Other embodiments may not include such templates at all. Although the current embodiment uses a graphical user interface, a user-friendly user interface commonly used today, other embodiments are contemplated that use other more or less user friendly means to interact with the user.

Rules Log

The rules log 300, as shown in FIG. 1, is the repository for information related to rules that have been triggered. A log entry in rules log 300 is created when a rule is triggered. In the current embodiment when a rule is triggered by the rules engine 150 the rules engine 150 writes the information related to the triggering of the particular rule to the rules log 300. Among the information stored is whether the associated action was a success or a failure as indicated by the action provider 420. The rules log 300 may be designed in such a manner as to continue to receive new entries and close open ones in any sequence while any number of them remain open or have otherwise been closed. In the current embodiment, a user can view the entries in rules log 300 using rules GUI 200. Other embodiments may provide other means to examine the results of executed rules, and yet other embodiments may not include any such rules log whatsoever. In the current embodiment, the information in the log 300 is not stored in plain text. This is because multiple numbers of log entries can be open and incomplete at any time. Specifically, the current embodiment contains the following entries: "the time the action was triggered;" "the text describing the action"—built from the action verb names and the object names; the time the action was completed; "the success or failure status of the action at the time it was attempted;" "if a failure was detected include the failed text describing the failure." Although the current embodiment does not store the information in plain text, it is contemplated that other embodiments may store this information in plain text.

The foregoing disclosure and description of the various embodiments are illustrative and explanatory thereof, and various changes in which functions are performed by which module, what information is stored in what module, what modules contact what other modules, whether some modules are subsets of other modules, whether providers are stand alone active processes or are processes activated only when called, the sequence and type of signals between modules or between modules and providers the required presence of any particular module, as well as in the details of the illustrated configurations and method of operation may be made without departing from the spirit and scope of the invention.

We claim:

1. A rules system for managing computer resources in a computer system, comprising:
   an event provider adapted to indicate an occurrence of an event in the computer system relating to computer resource usage;
   an action provider adapted to cause an action to be performed in the computer system;
   a rules database adapted to dynamically register the event provider and the action provider with the rules system, wherein the rules database maintains an extensible and dynamic rule set; and
   a rules engine coupled to the rules database and adapted to communicate with the event provider and the action provider and, according to rules in the rule set of the rules database, instructing the action provider to cause the action to be performed responsive to receiving the indication from the event provider of the occurrence of the event, wherein the action provider and event provider are adapted to operate independently and in conjunction with the rules engine, and wherein individual rules within the extensible and dynamic rule set can be created, deleted, or modified without recompilation of the rules engine.

2. The system of claim 1, wherein the event provider is responsive to the occurrence of an event and the action provider performs actions upon the computer resources.

3. The system of claim 2, further comprising communications allowing the system to control computer resources across different operating systems.

4. The system of claim 2, further comprising communications allowing the system to control computer resources across remote computer systems.

5. The system of claim 2, further comprising communications allowing the system to control computer resources by plugging into a browser.

6. The system of claim 1, wherein the event provider and the action provider register with the rules engine.

7. The system of claim 1, whereby the rules engine is adapted to attempt to connect to the event provider; and if the attempt fails the rules engine generates an event.

8. The system of claim 1, further comprising:
   a graphical user interface coupled to the rules database.

9. The system of claim 8, wherein graphical user interface displays information regarding the event provider and the action provider.

10. The system of claim 8, wherein the graphical user interface is used to edit rule information.

11. The system of claim 8, wherein the graphical user interface further comprises:
    a rules wizard for assisting the user in creating rules.

12. The system of claim 8, wherein the event provider and the action provider further register with the graphical user interface.

13. The system of claim 1, wherein the event further comprises:
    a data type; and
    an event statement.

14. The system of claim 1, wherein the action further comprises:
    a verb containing an action routine.

15. The system of claim 14, wherein the action further comprises:
    a list of objects associated with the verb.

16. The system of claim 1, wherein the event is not validated before it is executed.

17. The system of claim 1, wherein the action is not validated before it is performed.

18. The system of claim 1, wherein the rules engine is an event provider.

19. The system of claim 1, wherein the rules engine is an action provider.

20. The system of claim 1, further comprising:
    a plurality of independent event providers to indicate the occurrence of associated events in the system; and
    a plurality of independent action providers to cause associated actions to be performed in the system.

21. The system of claim 1, further comprising:
    a second event provider adapted to indicate the occurrence of a second event in the system;
    a second action provider adapted to cause a second action to be performed in the system;
    a second rules database adapted to register the second event provider and the second action provider wherein the second rules database maintains a second set of rules; and
    a second rules engine coupled to the second rules database and adapted to communicate with the second event provider and the second action provider and, according to rules in the second rules database, instructing the second action provider to cause the second action to be performed responsive to receiving the indication from the second event provider of the occurrence of the second event.

22. The system of claim 21, wherein the second event provider is responsive to the occurrence of a second event and the second action provider performs actions upon the computer resources.

23. A method of using a rules system to manage computer resources, comprising:

associating an event provider with an event relating to computer resource usage;

associating an action provider with an action that impacts the computer resource usage;

defining a rule by associating the event with the action;

storing the rule in a rules database such that the rule is accessible by a rules engine;

dynamically registering the event provider and the action provider in the rules database with the rules system such that the rule can be modified or deleted and other rules can be created without compiling the rules engine;

detecting the event through the event provider; and performing the action associated with the event.

24. The method of claim 23, further comprising:
editing the event; and
editing the action.

25. The method of claim 23, comprising:
storing information regarding the performance of the action in a rules log.

26. The system of claim 1, wherein the action comprises changing an operation of a physical component of a computer resource that either caused or is impacted by the event.

27. They method of claim 23, comprising operating the even provider and the action provider independently and in conjunction with the rules engine.

* * * * *

UNITED STATES PATENT AND TRADEMARK OFFICE
CERTIFICATE OF CORRECTION

| | |
|---|---|
| PATENT NO. | : 7,080,142 B2 |
| APPLICATION NO. | : 10/251089 |
| DATED | : July 18, 2006 |
| INVENTOR(S) | : Jeffery L. Galloway et al. |

Page 1 of 1

It is certified that error appears in the above-identified patent and that said Letters Patent is hereby corrected as shown below:

In column 5, line 33, delete "80°/" and insert -- 80% --, therefor.

In column 14, line 10, in Claim 27, delete "They" and insert -- The --, therefor.

In column 14, line 11, in Claim 27, delete "even" and insert -- event --, therefor.

Signed and Sealed this

Thirty-first Day of March, 2009

JOHN DOLL
*Acting Director of the United States Patent and Trademark Office*